United States Patent [19]

Garrick, Jr.

[11] Patent Number: 5,295,300
[45] Date of Patent: Mar. 22, 1994

[54] SALVAGE METHOD FOR TURBOCHARGER BEARING HOUSING

[75] Inventor: James J. Garrick, Jr., Cordova, Tenn.

[73] Assignee: Cummins Engine Company, Inc., Columbus, Ind.

[21] Appl. No.: 912,797

[22] Filed: Jul. 13, 1992

[51] Int. Cl.$^5$ .............................................. B23P 6/00
[52] U.S. Cl. ........................ 29/88.021; 29/402.06; 29/402.11; 29/402.19; 29/402.21; 29/889.2; 29/898.01
[58] Field of Search ............... 29/888.011, 888.021, 29/402.06, 402.09, 402.11, 402.13, 402.16, 402.19, 402.21, 426.2, 898.01

[56] References Cited

U.S. PATENT DOCUMENTS

| | | | |
|---|---|---|---|
| 1,900,682 | 3/1933 | Alcott | 29/898.01 |
| 2,752,668 | 7/1956 | Sheen | 29/402.11 X |
| 4,414,725 | 11/1983 | Breitweiser et al. | 29/888.011 |
| 4,435,126 | 3/1984 | Schneider | 416/186 R |
| 4,460,284 | 7/1984 | Lauterbach et al. | 384/126 |
| 4,560,325 | 12/1985 | Yoshioka et al. | 417/407 |
| 4,691,423 | 9/1987 | Willyard, Jr. et al. | 29/402.06 X |
| 4,852,236 | 8/1989 | Emery et al. | 29/402.11 |
| 4,969,805 | 11/1990 | Romeo | 417/407 X |

FOREIGN PATENT DOCUMENTS

61-115634  6/1986  Japan ........................ 29/898.01
1346382  10/1987  U.S.S.R. .................... 29/402.11

Primary Examiner—Mark Rosenbaum
Assistant Examiner—S. Thomas Hughes
Attorney, Agent, or Firm—Woodard, Emhardt, Naughton, Moriarty & McNett

[57] ABSTRACT

A salvage method for a turbocharger bearing housing includes the steps of removing the bearing housing from the turbocharger, setting up the bearing housing on a lathe and machining the worn or damaged surfaces at one end of the bearing housing where such damage has been caused by the turbocharger heat shield. Once the metal is removed from the worn or damaged portions of the bearing housing a salvage sleeve having a hollow, generally cylindrical shape is pressed down onto the prepared surfaces of the housing. Since the assembly of the salvage sleeve to the machine bearing housing will be an interference fit, the salvage sleeve is heated so that it can slide freely onto the machined outside diameter of the bearing housing. Once the sleeve cools and the interference fit is established, the salvage sleeve is machined so as to reestablish the original dimensions of the turbocharger bearing housing prior to becoming worn or damaged.

1 Claim, 7 Drawing Sheets

SALVAGE METHOD FOR TURBOCHARGER BEARING HOUSING

BACKGROUND OF THE INVENTION

The present invention relates in general to salvage techniques for costly machine components whereby the damaged or worn portion of the component is replaced by a specially-made sleeve or insert. The present invention also relates in general to the final design of the reworked component as a result of performing the salvage technique.

More particularly the present invention relates to a salvage technique for a turbocharger bearing housing where a portion of the outside diameter of the housing has been damaged in the area contacted by the heat shield. Further, the present invention relates to the design of the turbocharger bearing housing which results from the salvage technique.

Salvage techniques to repair or recondition damaged or worn surfaces or portions of the component or device are known in the art. One technique which may be employed is the method of metal deposit or plating in order to build up a worn surface and bring it back to its near original dimensions. Another technique is to first machine down the worn area in order to prepare it for the receipt of a specially machined replacement or repair member. The repair member when used to build up an outside diameter surface includes an inside diameter surface or contour which is designed to match, often with an interference fit, the machined down surface or portion of the worn part. The repair member also includes an outer surface or outside surface portion which is contoured in order to simulate the original size and shape of the worn area.

In some applications and with some types of components it may not be possible or it may not be preferred to machine the completed assembly. Under such circumstances the sleeve or insert member used for repair of the worn or damaged part is precisely sized and shaped so that no post-assembly machining is required in order to restore the damaged part back to all of its original dimensions. In these situations there is a significant focus on the sizes, shapes and tolerances of the base component part while removing or preparing the worn area. There is also a significant focus on the sizes, shapes and tolerances of the repair member which is separately machined and designed to slip into or over the prepared portion of the component part. Consider for example U.S. Pat. No. 2,752,668 issued to Sheen on Jul. 3, 1956. The base part disclosed in this reference is a piston head portion 10 and the machined repair member is ring 16. The patent specification focuses on the critical selection of dimensions and tolerances so that "no machining was necessary after completion of the shrinkage" of the ring onto the piston head portion.

The concept of metal removal from the worn part and heat shrinking or pressing on a repair member is not limited to outside diameters and cylindrical shapes as disclosed in the Sheen patent. Consider U.S. Pat. No. 4,691,423 which issued to Willyard, Jr. on Sep. 8, 1987. The Willyard patent discloses a method for remanufacturing a compressor housing which involves machined removal of the inlet throat which has been damaged due to contact with the compressor wheel. A separately manufactured and carefully sized throat insert is provided and assembled into the compressor housing by heating the compressor housing to temporarily create a larger diameter. An alternative method of cooling the insert to reduce its size is also disclosed as a suitable method for assembly.

The general repair technique disclosed in Willyard, Jr. is not restricted to compressor housings. U.S. Pat. No. 4,852,236 which issued to Emery on Aug. 1, 1989 discloses the use of a insert to repair an inside diameter surface which has become worn or damaged. In Emery the salvage technique is applied to a worn wobbler housing for a constant-speed drive. While the new wear plate which is assembled into the housing is of a generally cylindrical nature, like the sleeve in Sheen, each specific application for a replacement or insert necessitates special consideration and design restrictions.

One consideration includes the size, shape and strength of the worn part relative to what surfaces can be machined down and how much can be taken off without adversely affecting the continued use of the assembly after repair or salvage. Another consideration is whether the insert or ring to be assembled to the main component part can be machined after assembly. In Sheen it was apparently preferred not to machine the remanufactured piston after assembly of the ring sleeve and thus the various dimensions and tolerances had to be more tightly controlled. In the patents issued to Willyard and Emery, some dimensions are more important than others and the salvage technique employed in each instance must be specifically and uniquely tailored for the environment and application of the completed part.

The concept of being uniquely tailored for the specific environment and application applies to the present invention. In the present invention the worn or damaged end of the turbocharger bearing housing is repaired by carefully and precisely machining selected surfaces and then installing a salvage sleeve to build back up the material thickness of the machine surfaces. After assembly of the sleeve to the bearing housing the outside diameter of the sleeve is turned down thereby both shaping it and bringing the dimensions back in line to those of the originally manufactured housing.

More specifically the environment for the present invention is a diesel engine turbocharger bearing housing. Due to vibration and thermal expansion the V-band clamp may become loose and if this occurs the heat shield will be allowed to move radially. This in turn causes damage to the area of the housing which contacts the heat shield. Left unrepaired this type of failure mode can lead to catastrophic failure of the turbocharger. The salvage technique described herein enables the user to repair the damaged portion and reestablish the original part dimensions and specifications.

SUMMARY OF THE INVENTION

A salvage method for a turbocharger bearing housing according to one embodiment of the present invention comprises the steps of first disassembling the bearing housing from the turbocharger, setting up the bearing housing on a lathe and removing metal from the areas damaged by the heat shield. The next step is to provide a salvage sleeve which has a hollow and generically cylindrical shape and which is dimensioned to fit tightly onto the machined down areas of the bearing housing. The next step is to heat the salvage sleeve so that it can slide over the prepared end of the bearing housing without interference, then pressing the sleeve onto the machined surfaces of the bearing housing and allowing the sleeve to cool so as to establish an interference fit. The final step is to machine the assembled salvage sleeve in order to reestablish the original dimensions of the bearing housing.

According to another embodiment of the present invention a salvaged bearing housing for use in a turbocharger comprises a main housing member having an outside diameter portion and a salvage sleeve having an inside diameter portion slightly smaller than the outside diameter portion of said main housing member so as to require an interference fit when said salvage sleeve is assembled to said main housing portion.

One object of the present invention is to provide an improved salvage method for a turbocharger bearing housing.

Another object of the present invention is to provide an improved repaired turbocharger bearing housing.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
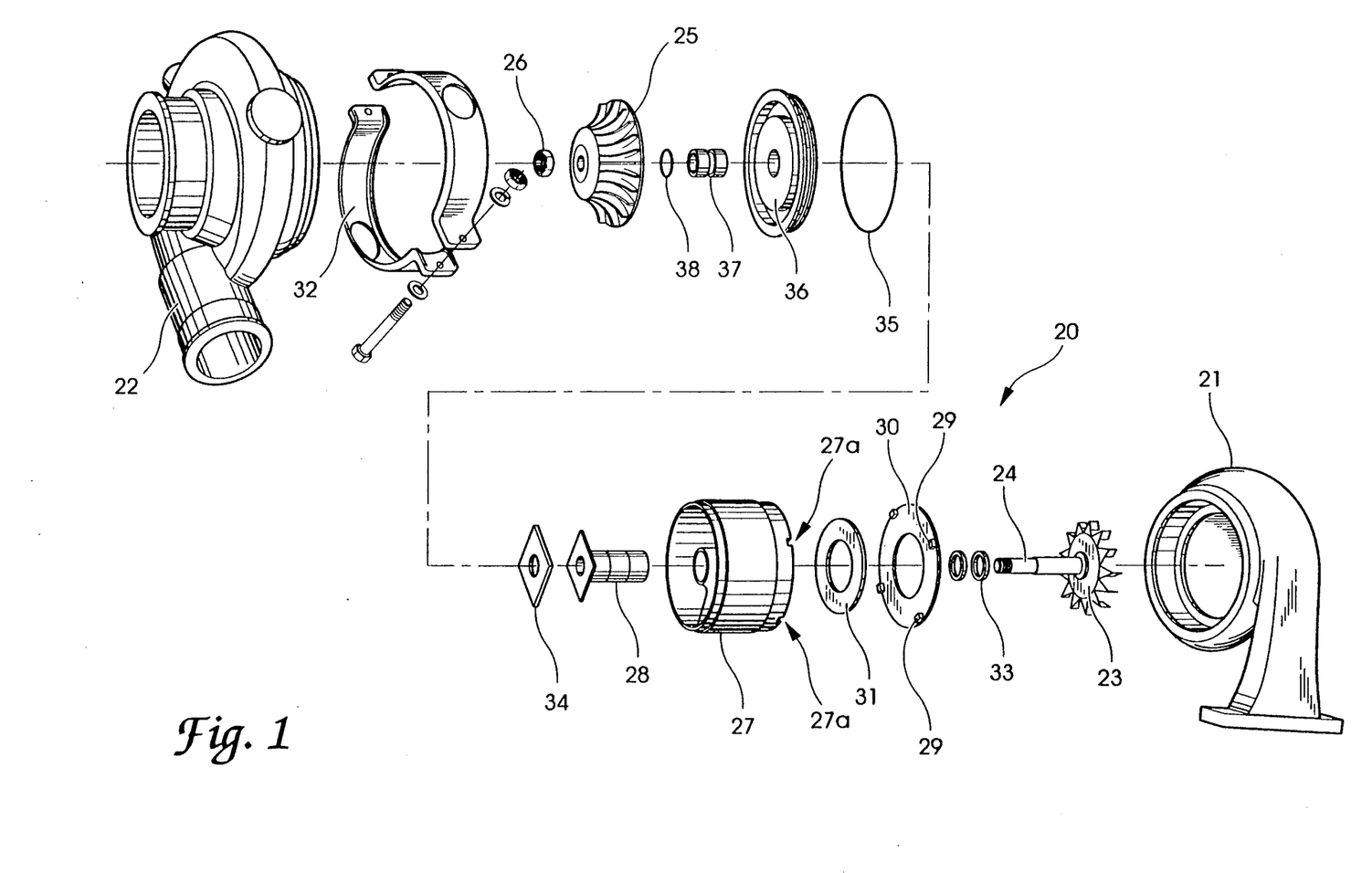
FIG. 1 is an exploded view of a diesel engine turbocharger which establishes the environment of the present invention.

Referring to FIG. 1 there is illustrated in exploded view form a turbocharger 20 as might be used, for example, with a diesel truck engine. Turbocharger 20 includes turbine housing 21 at one end or side Of the assembly and compressor housing 22 at the other side or opposite end of the assembly. The turbine wheel 23 is fixed on shaft 24 and the compressor wheel 25 is in turn assembled to shaft 24 by rotor nut 26. Consequently, the turbine wheel and compressor wheel will be driven at the same speed in a connected, synchronized fashion.

Bearing housing 27 holds bearing 28 through which shaft 24 extends and spins. The end 27a of housing 27 which faces the turbine housing 21 is notched at four equally spaced locations 27b so as to match the four raised projections 29 on heat shield 30.

Disposed between bearing housing 27 and heat shield 30 is an annular ring disk 31 of insulation material. V-band clamp 32 holds the heat shield 30 against the bearing housing 27 in compression. The remaining components which are illustrated include oil control ring 33, turbocharger bearing insert 34, O-ring 35, oil seal plate 36, oil seal sleeve 37, and oil control ring 38.

Figure 2:
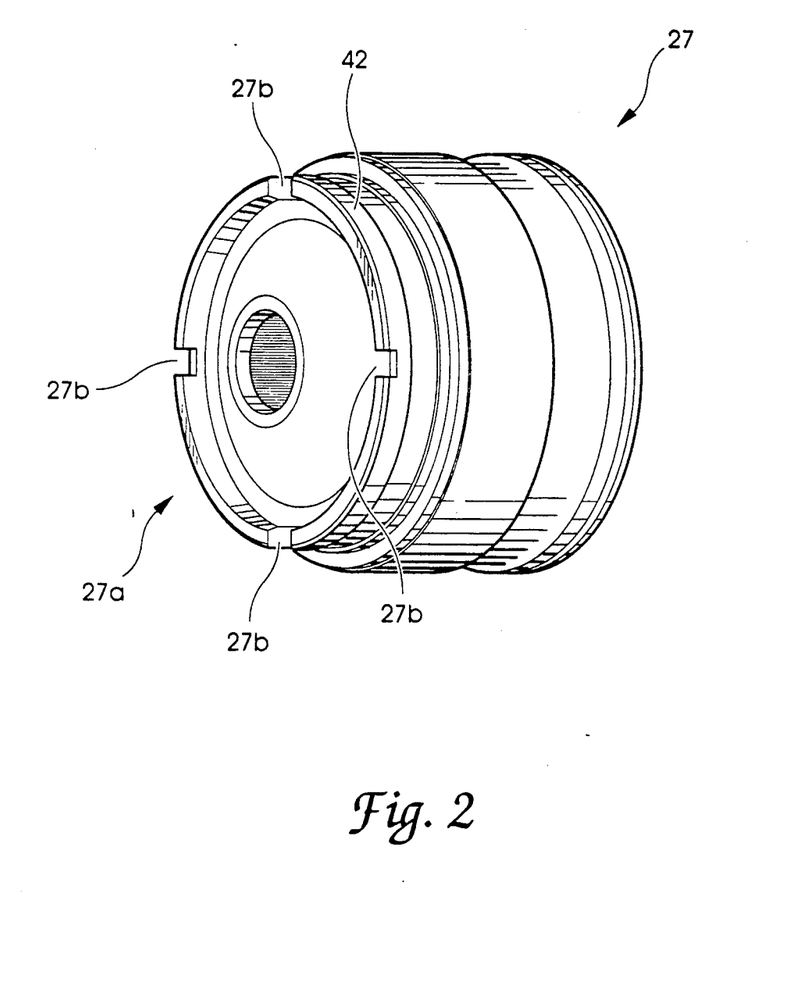
FIG. 2 is a perspective view of the bearing housing removed from the FIG. 1 turbocharger and turned 180 degrees to provide a reverse orientation.

Referring to FIG. 2 bearing housing 27 is illustrated through now turned end to end on axis roughly 180 degrees from the perspective, exploded-view orientation of FIG. 1. As shown, face 27a includes a surrounding wall 42 into which four equally spaced notches 27b have been machined. When the turbocharger is properly assembled and all parts are within their required dimensions and tolerances, the heat shield 30 fits closely up against face 27a such that the four projections 29 the four notches 27b. These two members are held in this condition, under normal operation, by the clamping action of V-band clamp 32. During normal turbocharger operation the components are subjected to engine vibration and thermal expansion. This may cause the V-band clamp to loosen. This results in movement between the turbine housing 21, bearing housing 27 and the compressor housing 22. The heat shield 30 is allowed to move radially causing the bearing housing 27 to be damaged in the area that contacts heat shield 30. In particular the heat shield projections 29 begin moving in the notches 27b and actually carve away at the side walls of the notches. Normally the rotary migration of the heat shield is either clockwise or counterclockwise and when the shield has traveled 90 degrees, the entire end of the housing (wall 42) has been carved away by the four projections. This reduction in axial length destroys the spacing between the turbine housing and the compressor housing. This failure mode will lead to a catastrophic mechanical failure of the turbocharger unless the bearing housing is repaired or replaced.

Figure 3:
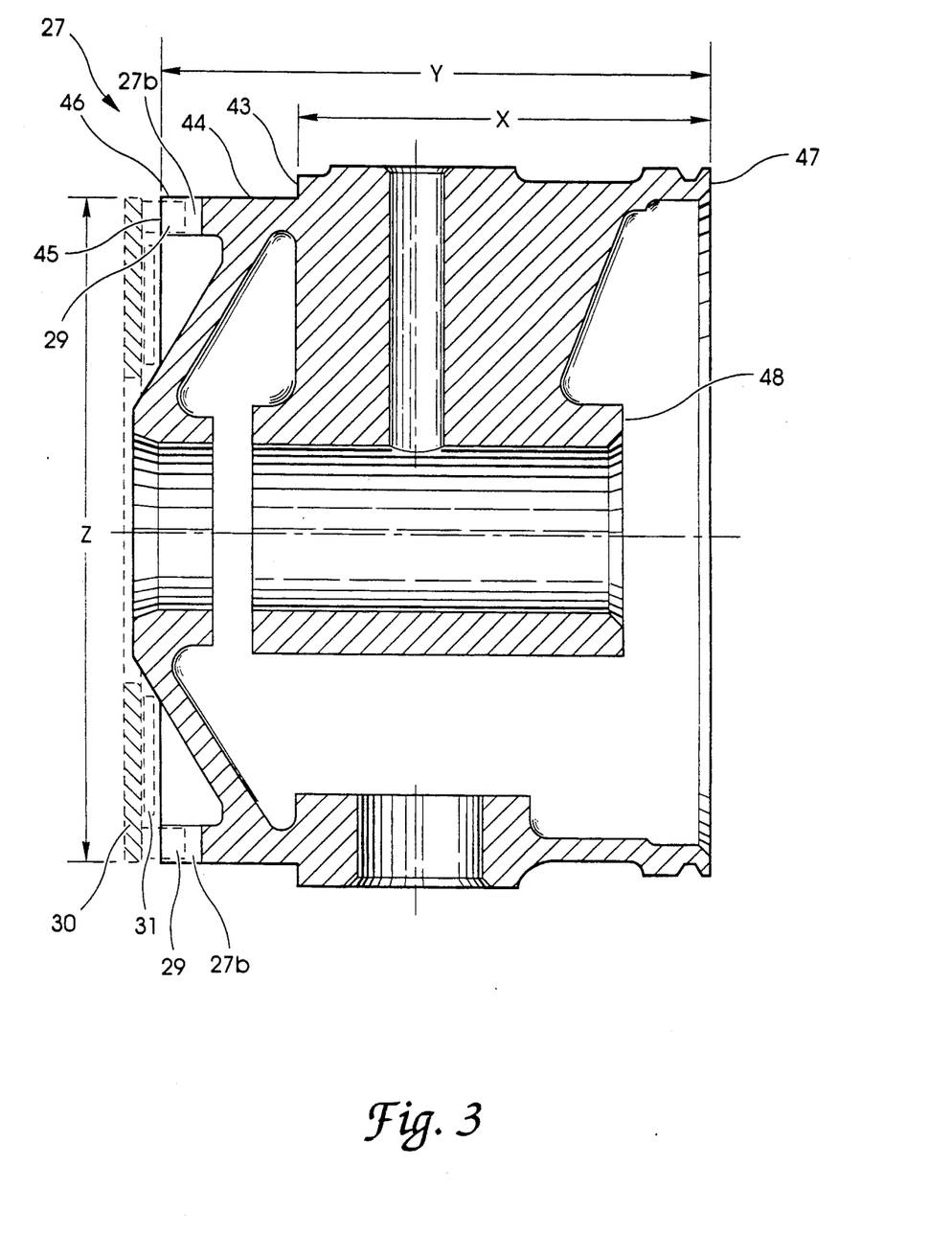
FIG. 3 is a side elevational view in full section of the FIG. 2 bearing housing.

Referring to FIG. 3 there is a side elevational view in full section of bearing housing 27 with face 27a on the left side of the illustration. The section cutting plane has been taken through the top and bottom notches 27b of the FIG. 2 illustration of the bearing housing thus accounting for why the top edge and bottom edge of wall 42 are not illustrated with section lines.

Illustrated in broken line form as part of FIG. 3 are disk 31 and heat shield 30. As shown, the heat shield projections 29 are seated within notches 27b. When the V-band clamp 32 becomes loose due to engine vibration and thermal expansion, the result is movement between the turbine housing 21, the bearing housing 27 and the compressor housing 22. When this occurs the heat shield 30 is allowed to move radially and causes damage to the areas of the bearing housing that contact the heat shield. The areas affected are the portions of wall 42 that extend between the four notches 27b. These areas of damage are identified as surfaces 45 and 46. Since this type of damage can in time lead to catastrophic failure of the turbocharger, it becomes necessary to repair or replace the bearing housing 27. While a complete replacement of the bearing housing is an option, it represents a much higher cost option than salvage of the housing. Consequently, if a means could be devised to repair or replace the worn or damaged portions of the housing without having to scrap the entire housing, then such a salvage technique would result in a substantial cost savings. The present invention provides such a salvage technique as is described hereinafter.

The salvage technique of the present invention begins with disassembly of the turbocharger 20 so as to remove the bearing housing 27. The bearing housing is then set up on a lathe by first cleaning and setting up the lathe and then loading the housing into the mandrel. One option as the first machining step on the lathe is to face off the back of the housing in order to clean up annular ring surface 47. Additionally, the back of the shaft sleeve portion may he machined in order to clean up annular ring surface 48. The amount of metal to be removed from each annular ring surface is minimal and is just enough to cleanup the surfaces and true up the dimensions.

The primary clean up and machining of the housing involves surfaces 43, 44, 45 and 46 which are the surfaces that must be reworked even though the heat shield damage only exists on surfaces 45 and 46. In fact if the projections have carved away the entirety of wall 42, at least to the depth of each notch then there is no outer end face surface 45 nor any outside diameter surface 46 left, only surface 44, which is an outside diameter surface and inner end face surface 43. Material is removed from surface 43 so as to reduce dimension X and from surface 45 (if anything is left) so as to reduce dimension Y. The machining set up on a lathe also turns down outside diameter surfaces 44 and 46 (if anything is left) so as to reduce diameter dimension Z.

Dimension X is nominally set between 2.989 and 2.992 inches and is reduced to a dimension of between 2.885 and 2.890 inches. Dimension Y is nominally set between 4.005 and 4.010 inches and is reduced to a dimension of between 3.570 and 3.575 inches. Dimension Z is nominally set between 5.050 and 5.052 inches and is reduced to a dimension of between 4.875 and 4.876 inches.

Figure 4:
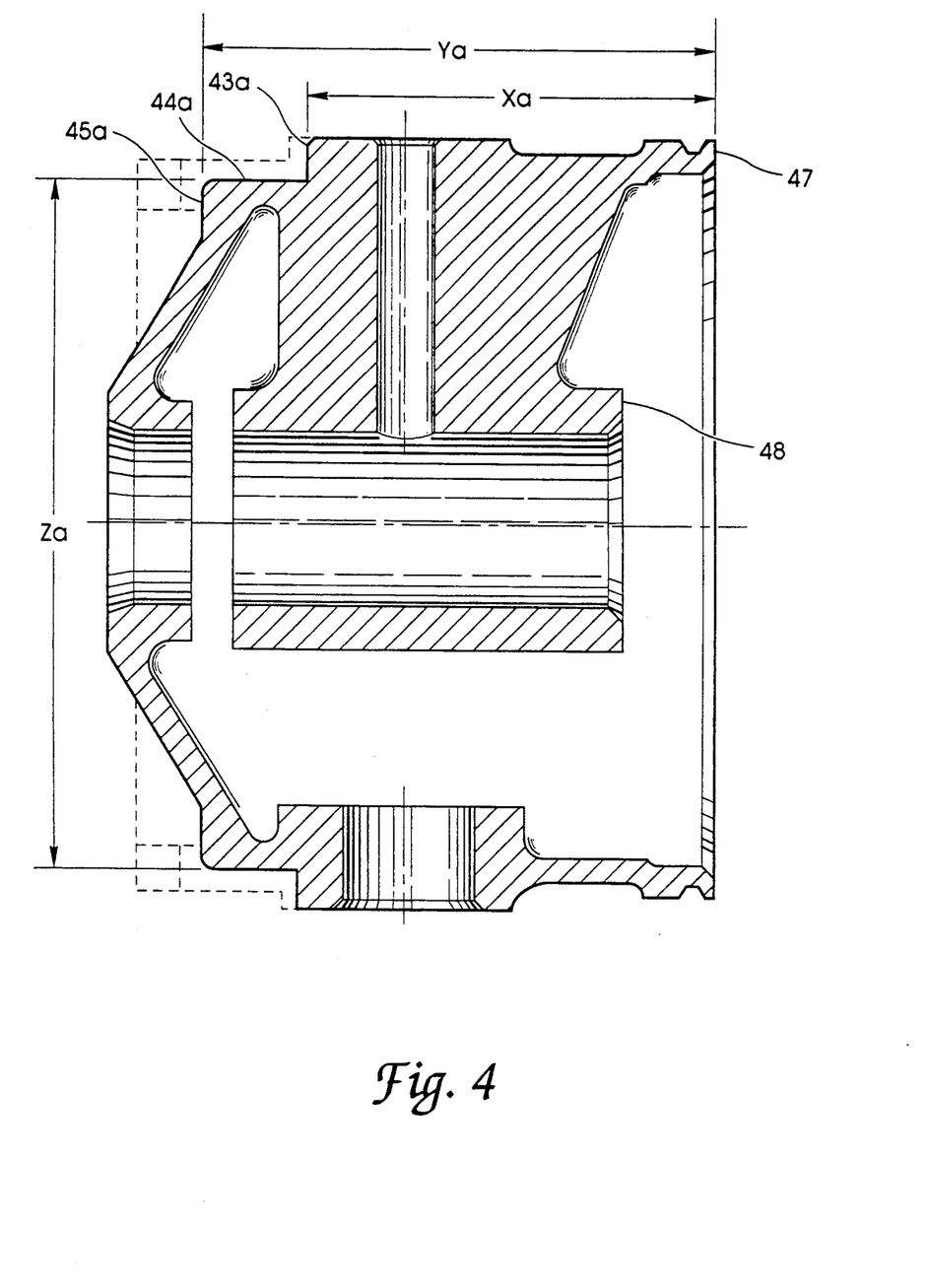
FIG. 4 is a side elevational view in full section of the FIG. 3 bearing housing after the worn and damaged surfaces have been machined down.

FIG. 4 illustrates the condition of bearing housing 27 after the various surfaces 43, 44, 45, 47 and 48 have been machined. The reduced surfaces are correspondingly identified by reference numerals 43a, 44a, 45a, 47a and 48a. Note that the outside diameter surface of wall 42 extending between notches 27b and only for the depth of the notches, what has been referenced as surface 46, is now completely removed. The remainder of the outside diameter corresponding to dimension Z is surface 44. The material removed from surfaces 43, 44 and 45 and the removal surface 46 are shown in broken line form. The corresponding dimensions to dimensions X, Y and Z are identified as Xa, Ya and Za to represent the reduced dimensions.

Figure 5:
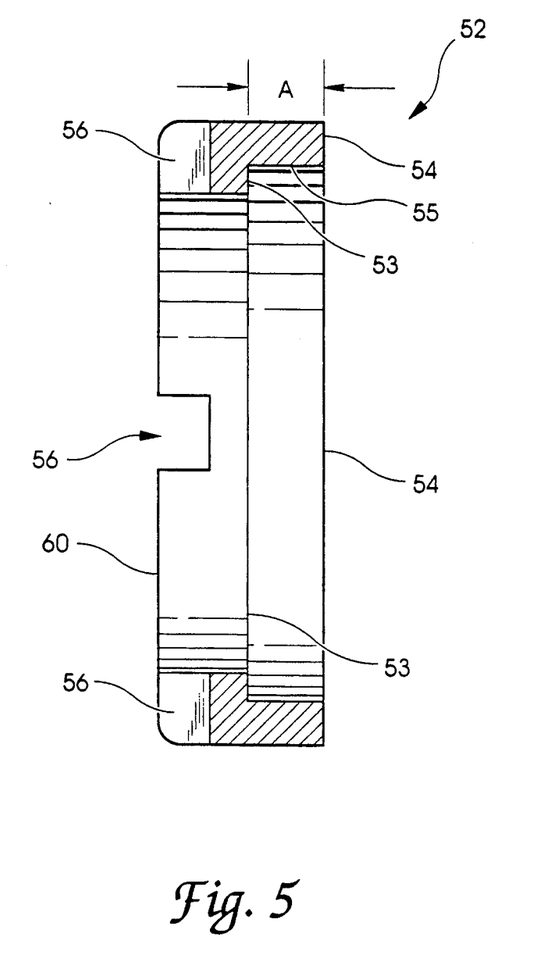
FIG. 5 is a side elevational view in full section of a salvage sleeve to be used to repair the bearing housing according to the present invention.

Referring to FIG. 5, salvage sleeve 52 is illustrated. The sleeve is assembled to the bearing housing in order to build back up machined surfaces 43, 44 and 45 and to reestablish an outer wall surface between the new notches to be provided. The depth of surface 53 from edge surface 54 and the diameter size of surface 55 are precisely dimensioned and toleranced to create a desired interference fit with surface 44a. Ideally edge surface 54 fits tightly up against surface 43a and with surface 53 up against surface 45a. The minimum to maximum dimension between surfaces 43a and 45a is from 0.680 to 0.690 inches. Dimension A which defines distance from surface 54 to surface 53 is 0.690 to 0.692 inches. There will thus be somewhere between a line-to-line fit to up to 0.012 inches of clearance for surfaces 53 and 54 against surfaces 45a and 43a, respectively. Sleeve 52 is fabricated with four, equally spaced notches 56 which correspond in radial width and spacing to notches 27b.

Figure 6:
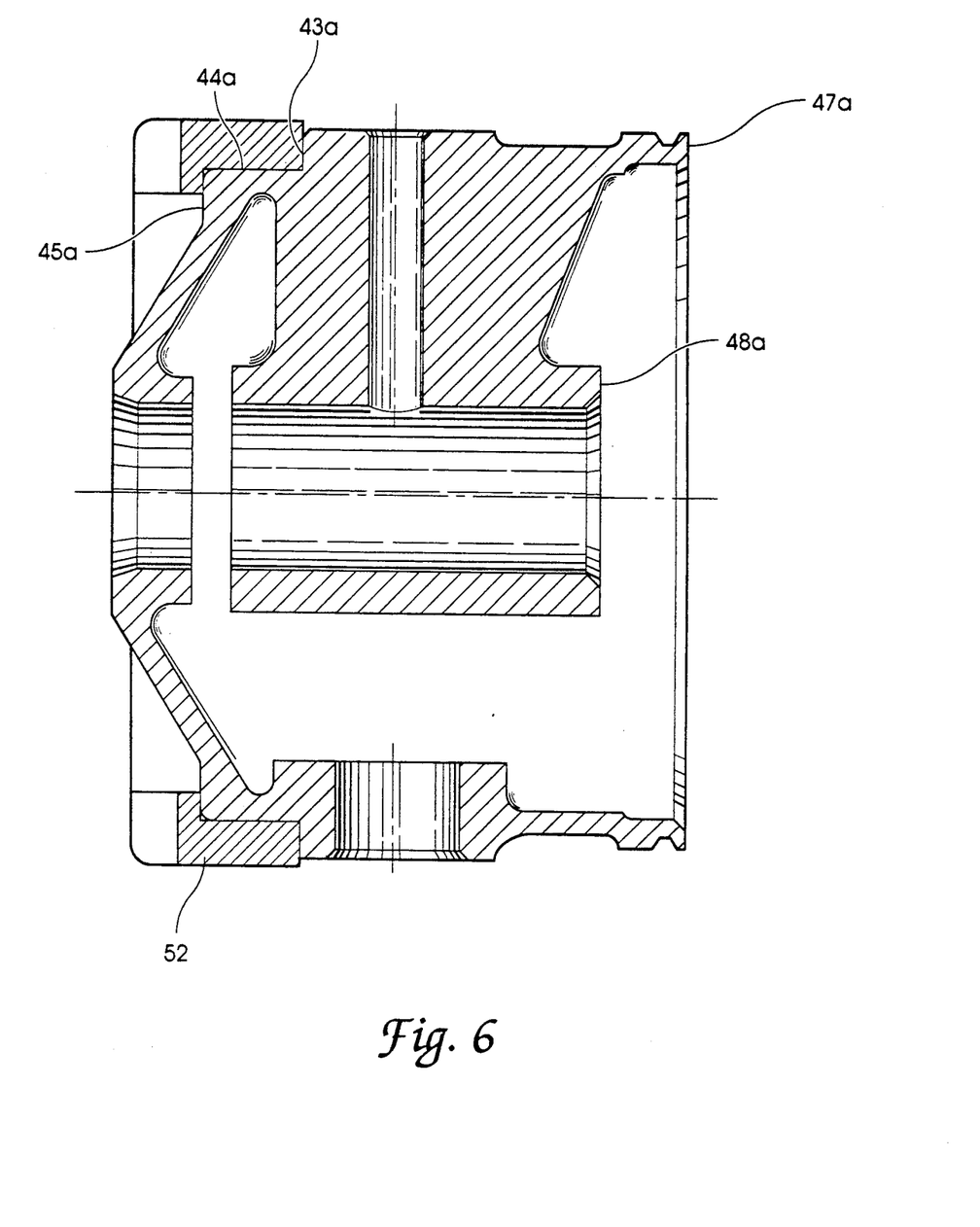
FIG. 6 is a side elevational view in full section of the FIG. 5 sleeve as assembled to the FIG. 4 machined bearing housing.

The diameter of surface 55 measures 4.870 to 4.872 inches. The diameter of surface 44a is 4.875 to 4.876 inches and this results in an interference fit of between 0.003 and 0.006 inches. Consequently, in order to assemble the salvage sleeve 52 to the bearing housing 27 as illustrated in FIG. 6 the salvage sleeve is heated to expand the size of surface 55 and allow the sleeve to slide over surface 44a. Then as the sleeve cools and contracts, a tight interference fit is established. One alternative to this particular assembly approach is to cool the housing so that it contracts. Under some circumstances it might be desirable to both heat the salvage sleeve and cool the bearing housing.

Figure 7:
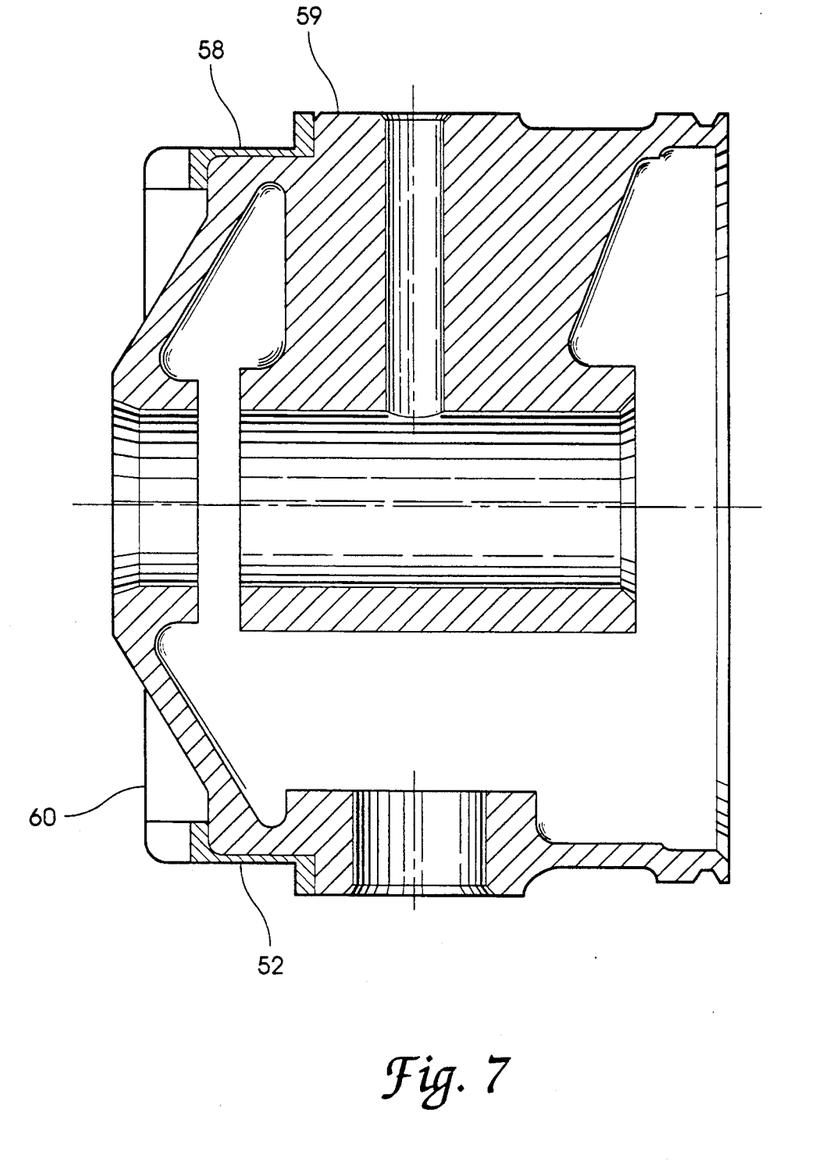
FIG. 7 is a side elevational view in full section of the final configuration of the bearing housing after the salvage sleeve has been machined to reestablish the original dimensions of the bearing housing.

The next step in this salvage technique is to machine the salvage sleeve down to the appropriate dimensions so as to reestablish the desired original dimensions for the bearing housing. This final machining step involves reducing surface 58 in diameter as well as creating the outwardly radiating lip 59 (see FIG. 7). Additionally, surface 60 is reduced slightly in this final machining step and the final reworked and repaired bearing housing is illustrated in FIG. 7. Once the bearing housing is reworked, the turbocharger can be reassembled.

If it later becomes necessary to repair the housing a second time due to heat shield damage, the salvage sleeve can be removed by heating the sleeve and cooling the base bearing housing and then installing a new sleeve. Assuming that any subsequent damage is limited to the first salvage sleeve, once this is removed the underlying dimensions of the bearing housing component should be acceptable for the installation of a second salvage sleeve. One such a salvage sleeve is applied, the only machining step would involve reducing the outside diameter surface and reestablishing the radial lip and facing off the end surface.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of salvaging a turbocharger bearing housing which has damaged portions, the method comprising the steps of:

(a) disassembling the bearing housing out of the turbocharger, said bearing housing having an outer end face surface, an inner end face surface and an outside diameter surface extending therebetween;

(b) setting up the bearing housing on a lathe in order to machine the damaged portions;

(c) machining the bearing housing to remove metal from the damaged portions of the bearing housing, said damaged portions including part of said outside diameter surface and said outer end face surface;

(d) machining the bearing housing to remove metal from portions of the bearing housing which are not damaged, said portions including the remainder of said outside diameter surface and said inner end face surface;

(e) providing a salvage sleeve having a hollow, generally cylindrical shape, an outside diameter surface, an outer end surface, an inner end surface and an inside diameter dimension adjacent said inner end surface which is slightly smaller than the machined outside diameter surface of the bearing housing;

(f) heating said salvage sleeve so as to expand its inside diameter dimension to a dimension larger than that of the machined outside diameter surface of the bearing housing;

(g) pressing said heated salvage sleeve onto the machined outside diameter surface of said bearing housing; and (h) machining the assembled salvaged sleeve in order to reestablish the original dimensions of said bearing housing by turning down at least part of the outside diameter surface of the salvage sleeve and cleaning off the outer end surface of the salvage sleeve.

* * * * *